(No Model.)

C. K. BRANDENBURG.
VEHICLE BRAKE.

No. 507,480.      Patented Oct. 24, 1893.

Witnesses

Inventor
C. K. Brandenburg
by John Wedderburn
Attorney

UNITED STATES PATENT OFFICE.

CLYDE K. BRANDENBURG, OF BLY, OREGON.

VEHICLE-BRAKE.

SPECIFICATION forming part of Letters Patent No. 507,480, dated October 24, 1893.

Application filed February 4, 1893. Serial No. 460,946. (No model.)

*To all whom it may concern:*

Be it known that I, CLYDE K. BRANDENBURG, of Bly, in the county of Klamath and State of Oregon, have invented certain new and useful Improvements in Brakes; and I do hereby declare the following to be a full, clear, and exact description of the invention, such as will enable others skilled in the art to which it appertains to make and use the same.

My invention is an improvement in brake-blocks designed for its, simplicity, durability and cheapness of construction and efficiency of operation.

My invention more particularly resides in the novel combination, construction and arrangement of parts hereinafter fully described and set forth in the claims.

Figure 1:
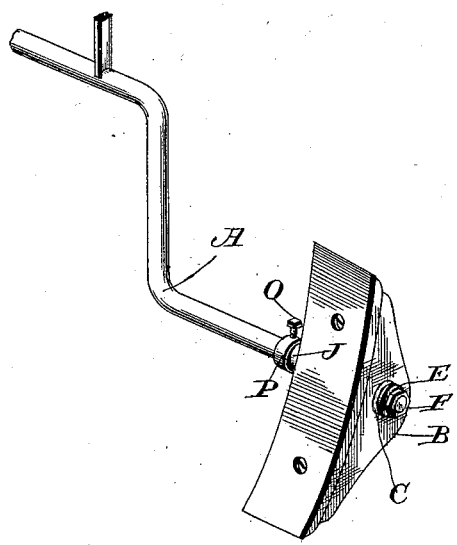
Figure 2:
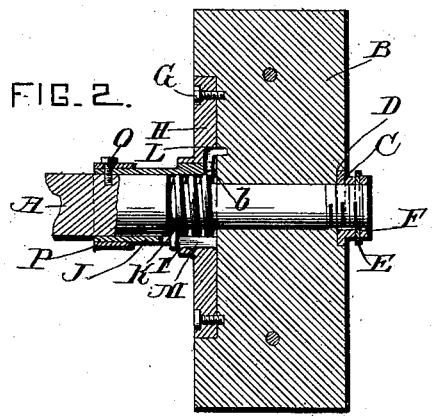
Figure 3:
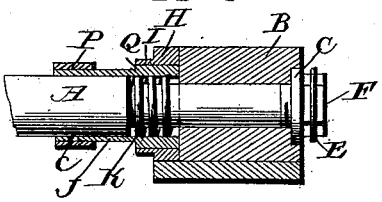
Figure 4:
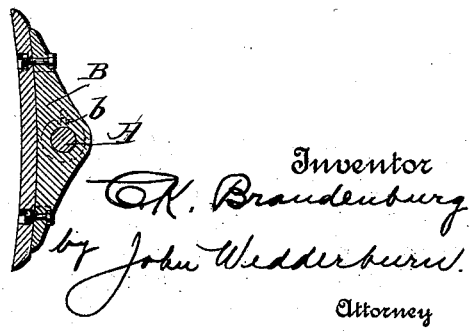

In the accompanying drawings, in which similar letters of reference designate corresponding parts, Figure 1 is a perspective view of my improved block attached to the brake shaft of a wagon. Fig. 2 is a vertical section through the center of the brake-shaft; and Fig. 3 is a transverse section of shaft and block. Fig. 4 is a detail.

Reference being had to the above figures A represents the brake shaft of an ordinary vehicle. On the outer end of the shaft A is revolubly secured the metal block B by means of the nut C which rests in the countersunk portion D of the block, the nut C being prevented from turning by means of the washer E and nut F, one side of the threaded portion of the shaft A being flattened as shown in Fig. 2 to prevent the washer E from turning. The object of having the block B countersunk at D is to lessen the liability of moisture or other foreign substance from gaining access to the interior working parts of the block.

Secured to the opposite side of the block B from the countersunk portion D by means of screws G is the plate H and lying flush with the outer surface of the block as shown in Fig. 1. The central portion of the plate H contains the flanged hole I, the flange being intended to overlap the sleeve J, thus preventing foreign substances from reaching the center of the block.

Encircling the shaft A between the block B and sleeve J is the coil spring K one end of which is bent at right angles in the direction of the shaft A and projects into the recess L in the block B where it is held by means of the plate H, while its other end is bent outwardly at right angles to the shaft A and is prevented from turning by passing through the slot M in the sleeve J where it is held by means of the flange or boss on the outer edge of the hole I.

To limit the distance of revolution of the block B, I have provided the projections *b b* on the inner edge of the flanged hole I which project into the cut-away portion N of the sleeve J. The projections *b, b* pass one on either side of the inner bent portion of the spring K thus relieving the levered strain at the point of bending of the spring.

At the inner end of the sleeve J is situated the oblong slot (*c*) through which the set screw O after passing through the loose ring P, passes, the object of the slot being to afford means for adjusting the position of the block B without straining the spring K.

As will be observed by reference to the drawings, I have constructed the sleeve J with a shoulder Q in order to lessen the liability of dirt traveling along the sleeve and into the interior of the block, and to supply means for drawing moisture from the working parts of the block, if such should gain access, I have continued the slot M beyond the end of the spring K.

The construction and arrangement of the several parts of my brake being thus made known the operation and advantages of the same will, it is thought be readily understood.

I am aware that prior to my invention brake blocks have been made containing springs, the object derived from such construction being therefore generally known. I therefore do not claim such a combination broadly; but What I do claim as my invention, and desire to secure by Letters Patent, is—

1. In an article of the class described the combination of a brake-shaft, a brake block revolubly secured to said shaft, a sleeve adjustably secured to said brake shaft, a spring encircling said shaft, one end of said spring being secured to said brake-block while the other end is secured to said sleeve, substantially as and for the purpose set forth.

2. In an article of the class described the combination of a brake-shaft, a brake block revolubly secured to said shaft, a sleeve adjustably secured to said brake shaft, a spring encircling said shaft, one end of said spring being secured to said brake-block while the other end is secured to said sleeve, one or more projections on said block adapted to come in contact with corresponding projections on said sleeve, the object of said projections being to limit the amount of revolution of said block on said sleeve substantially as and for the purpose set forth.

In testimony whereof I have signed this specification in the presence of two subscribing witnesses.

CLYDE K. BRANDENBURG.

Witnesses:
DAVID W. MATTHEWS,
HORACE W. COX.